United States Patent
Tominaga et al.

(10) Patent No.: US 7,916,045 B2
(45) Date of Patent: Mar. 29, 2011

(54) SCALE FOR PHOTOELECTRIC ENCODER

(75) Inventors: Atsushi Tominaga, Miura-gun (JP); Takashi Kanno, Asao-ku (JP)

(73) Assignee: Mitutoyo Corporation, Kawasaki (JP)

( * ) Notice: Subject to any disclaimer, the term of this patent is extended or adjusted under 35 U.S.C. 154(b) by 5 days.

(21) Appl. No.: 12/385,543

(22) Filed: Apr. 10, 2009

(65) Prior Publication Data
US 2009/0267803 A1 Oct. 29, 2009

(30) Foreign Application Priority Data
Apr. 25, 2008 (JP) ................................. 2008-114798

(51) Int. Cl.
*H03M 1/22* (2006.01)
(52) U.S. Cl. ........................... 341/13; 427/162; 359/291
(58) Field of Classification Search .................... 341/13; 359/291; 427/162
See application file for complete search history.

(56) References Cited

U.S. PATENT DOCUMENTS
2006/0056006 A1 * 3/2006 Huibers et al. ................ 359/291
2006/0077525 A1 * 4/2006 Huibers ........................ 359/291
2008/0038455 A1 * 2/2008 Levich et al. ................ 427/162

FOREIGN PATENT DOCUMENTS
JP   A-2000-18973    1/2000
JP   A-2008-45931    2/2008

* cited by examiner

*Primary Examiner* — Jean B Jeanglaude
(74) *Attorney, Agent, or Firm* — Oliff & Berridge, PLC

(57) ABSTRACT

A scale for a photoelectric encoder effectively protects the base of the scale from corrosion, rust, and flaws. The scale includes a base, a light-absorbing layer including a DLC layer formed on at least one surface of the base, and light-reflecting layers with a higher reflectance than that of the light-absorbing layer with respect to light falling within a wavelength range and formed into a grating on the light-absorbing layer.

18 Claims, 3 Drawing Sheets

100

SCALE FOR PHOTOELECTRIC ENCODER

BACKGROUND

The present invention relates to a scale for a photoelectric encoder.

Scales for photoelectric encoders are roughly classified into amplitude grating scales and phase grating scales. The amplitude grating scale has a configuration in which high-reflectance gratings and low-reflectance gratings are arranged with a certain pitch. In a photoelectric encoder, a scale is irradiated with light, and the relative position with respect to the scale is determined from the difference in the reflection of light between the high-reflectance gratings and the low-reflectance gratings.

The high-reflectance gratings are composed of a metal such as gold (Au), aluminum (Al), and chromium (Cr), whereas the low-reflectance gratings are composed of various materials or based on various structures depending on the optical principle thereof.

For background information see, for example, Japanese Unexamined Patent Application Publication No. 2000-18973 and Japanese Unexamined Patent Application Publication No. 2008-45931.

SUMMARY

The low-reflectance gratings are usually based on optical principles such as absorption, reflection, interference, and scattering, and the relationship thereof with the base of the scale desirably meets demands such as (1) prevention of stress occurring in a thin film, (2) prevention of damage to the base during processing of the material of the gratings, (3) resistance against corrosion (resistance against oxidation (rust)) under high-temperature and high-humidity conditions, and (4) ensured in-plane uniformity. In particular, when a thin metal plate (metal tape) is used as the base so that a long scale may be reeled (rolled up into a reel), these demands become stricter.

For example, a known scale having a base of stainless steel (SUS) needs surface coating or surface treatment for improved rust resistance and thus complicates manufacturing processes and increases manufacturing cost. Furthermore, such surface coating and surface treatment necessitate optical properties having no influence on photo detection using an encoder.

According to an aspect of the invention, a scale is provided for a photoelectric encoder that detects reflection of light falling within a predetermined wavelength range. The scale includes a base, a light-absorbing layer including a DLC (Diamond Like Carbon) layer formed on at least one surface of the base, and a light-reflecting layer with a higher reflectance than that of the light-absorbing layer with respect to light falling within the predetermined wavelength range and formed into a grating on the light-absorbing layer.

This configuration enables determination of the relative position with respect to the scale from light reflected by a grating composed of the light-reflecting layer and another grating having the light-absorbing layer exposed.

In particular, the DLC layer contained in the light-absorbing layer, which is chemically stable and mechanically durable, protects the base, and thus acts as a barrier to corrosion, rust, and flaws and, at the same time, ensures the function of the light-absorbing layer.

Furthermore, the DLC layer solely provides a protection film for the base and acts as the light-absorbing layer, thereby simplifying the manufacturing process, which reduces the manufacturing cost. Also, the DLC layer is easy to control in terms of thickness during a film-forming process. When metal is used as the light-reflecting layer, the DLC layer also protects the base from damage caused by an etchant that is used for forming the gratings by etching of the metal.

Meanwhile, on the surface of the base on which the light-reflecting layer is formed, the thickness of the DLC layer is preferably in the range of 250 nm to 1 µm. In particular, when the internal stress of the DLC layer is taken into account, the thickness thereof is preferably 400 nm or smaller. Such a film thickness would ensure consistent reflectance that is not influenced by variations in the film thickness of the DLC layer and that sufficiently protects the base by acting as a barrier to corrosion, rust, and flaws.

Additionally, the DLC layer is preferably formed on the entire surface of the base. Such a DLC layer formed on the entire surface of the base would enable protection of the base from corrosion, rust, and flaws over the entire surface of the base.

Also, to achieve better adhesion to the base, the light-absorbing layer preferably has a binder layer containing metal between the base and the DLC layer. The binder layer preferably contains, for example, at least one of tungsten, tungsten carbide, chromium, and titanium. Furthermore, for example, when the binder layer contains tungsten carbide, the relative proportions of carbon and tungsten preferably vary along the direction of thickness. Preferably, in such a case, a tungsten carbide layer is provided in which the amount of carbon increases with increasing distance from the base and decreasing distance to the DLC layer.

Also, the light-absorbing layer preferably shows a reflectance equal to or lower than 20% with respect to light falling within the predetermined wavelength range described earlier. The DLC layer allows such a light-absorption layer to show a reflectance of equal to or lower than 20% with respect to light falling within the visible range and, when combined with a light-reflectance layer with a higher reflectance, provides a scale suitably used in a photoelectric encoder.

The present invention provides a scale for a photoelectric encoder in which the light-absorption layer having the DLC layer effectively protects the base from corrosion, rust, and flaws.

DETAILED DESCRIPTION OF EMBODIMENTS

Figure 1:
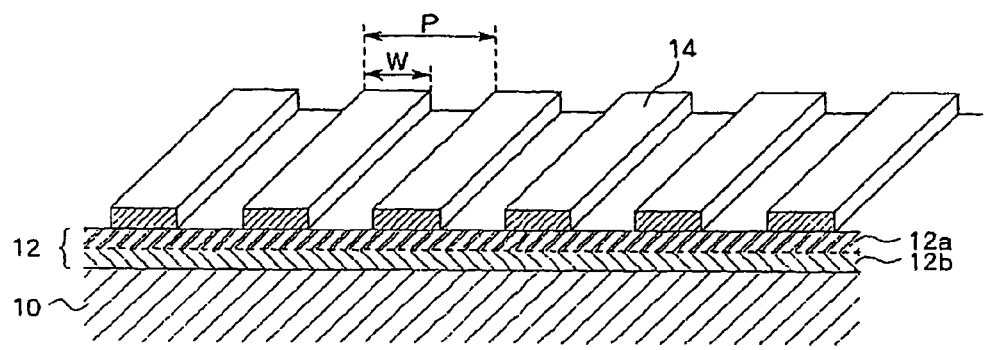
FIG. 1 shows the configuration of a scale for a photoelectric encoder according to a first embodiment of the invention.

A scale 100 for a photoelectric encoder according to an embodiment of the invention has, as shown in FIG. 1, a base 10, a light-absorbing layer 12, and a light-reflecting layer 14. FIG. 1 shows an enlarged view of the surface of the scale 100, and the scale 100 has a shape whose longest edges extend in the horizontal directions of FIG. 1. Also, FIG. 1 shows the individual members under magnification to make the configuration of the scale 100 easy to understand.

The base 10 is a member supporting the structure of the scale 100 and is made of metal, glass, plastic, or the like.

Examples of preferred materials include stainless steel, crystalline glass having an expansion coefficient of zero, and so forth.

The base 10 may take any shape depending on the intended application of the photoelectric encoder and other factors. This embodiment assumes that the base 10 is an ordinary, thin and long strip; however, the shape of the base is not limited and thus, in general, may be a thin and long prism or cylinder or the like. It is also preferable that the base 10 is a thin metal plate having a thickness in the range of 0.1 to 5 mm so that the scale 100 may be reeled (rolled into a reel).

Preferably, the surface of the base 10 is made smooth by lapping so that the optical properties of the light-absorbing layer 12 and the light-reflecting layer 14 are not degraded. The lapping treatment should be performed in such a manner that the surface roughness of the base 10 is sufficiently smaller than the thickness of the light-reflecting layer 14.

The light-absorbing layer 12 is formed as a layer with a lower reflectance than that of the light-reflecting layer 14 with respect to light falling within the wavelength range of light emitted from the light source of a photoelectric encoder to be used. For example, the light-absorbing layer 12 preferably exhibits a reflectance equal to or lower than 20% with respect to light having a wavelength to be used.

The light-absorbing layer 12 has a DLC (Diamond Like Carbon) layer 12a. The DLC layer 12a is an amorphous hard film composed mainly of carbon. The optical properties, chemical properties, and mechanical properties of the DLC layer 12a can be controlled by changing the hydrogen content, the bonding strength of carbon atoms, and other characteristics of the DLC layer.

Figure 2:
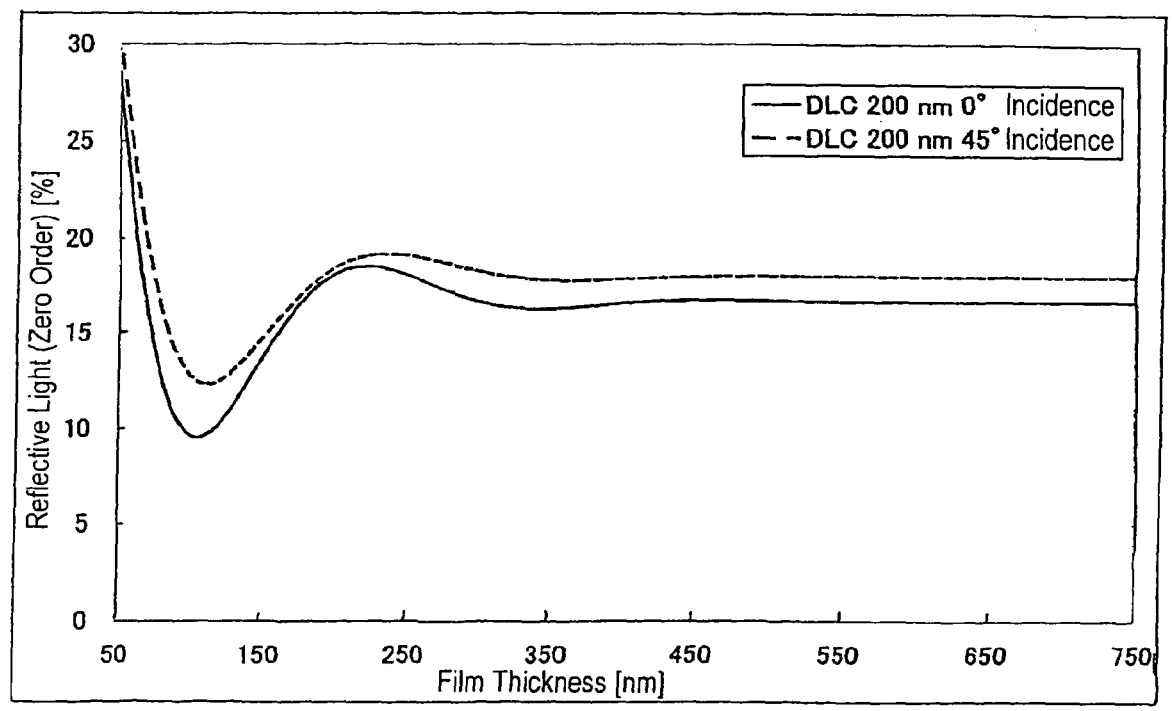
FIG. 2 is a diagram showing the relationship between the film thickness of a DLC film and the reflectance of the DLC film.

FIG. 2 is a diagram showing the reflectance (zero-order light) of the DLC layer 12a measured using light having a wavelength of 880 nm as the incident light versus the film thickness of the DLC layer. In FIG. 2, the solid line represents the reflectance measured when light enters the DLC layer 12a vertically (0°), whereas the broken line represents the reflectance measured when light enters the DLC layer 12a with the incident angle being 45°. As shown in FIG. 2, when the film thickness is 50 nm, the DLC layer 12a shows a reflectance of nearly 30%; however, as the film thickness approaches 250 nm, the reflectance drops down to be approximately in the range of 10 to 15% once and then rebounds to approximately 20%. After the film thickness reaches 250 nm, the reflectance keeps a constant level of approximately 17% when the incident angle is 0° and approximately 18% when the incident angle is 45° regardless of the film thickness.

Therefore, the DLC layer 12a constituting the light-absorbing layer 12 preferably has a thickness of at least 250 nm. A film thickness falling within this range would enable prevention of the fluctuation of reflectance within a single scale 100 or between a plurality of scales 100. The DLC layer 12a with the reduced fluctuation of reflectance has advantages; for example, it can be used to configure a simple detector for sensing reflected light and a circuit processing signals emitted from the detector. However, when the film thickness of the DLC layer 12a can be fully controlled or in other similar cases, the DLC layer 12a may have a film thickness equal to or smaller than 250 nm.

Meanwhile, for the purpose of reducing the manufacturing time and manufacturing cost, the film thickness of the DLC layer 12a is preferably 1 μm or smaller. Furthermore, the greater the film thickness of the DLC layer 12a, the greater the internal stress therein. Therefore, the film thickness of the DLC layer 12a is preferably 400 nm or smaller to avoid decreasing the adhesion of the film due to an increase in the internal stress.

A binder layer 12b is provided between the base 10 and the DLC layer 12a. This binder layer 12b functions as a buffer when the adhesion of the DLC layer 12a formed solely on the base 10 is insufficient. This means that the binder layer 12b is not necessary when sufficient adhesion between the base 10 and the DLC layer 12a is ensured.

For example, when the base 10 is stainless steel, the binder layer 12b may be tungsten (W), tungsten carbide (WC), chromium (Cr), or titanium (Ti) or any combination thereof. Tungsten (W) strongly adheres to stainless steel and tungsten carbide (WC) strongly adheres to the DLC layer 12a. Thus, it is also preferable to form the binder layer 12b from tungsten carbide (WC) so that the content ratio of carbon (C) increases approaching the DLC layer 12a. Furthermore, when the base 10 is stainless steel, titanium (Ti), having a comparable expansion coefficient, may also be preferably used to form the binder layer 12b. The binder layer 12b preferably has a thickness approximately in the range of 100 to 500 nm, if applicable.

Figure 3A:
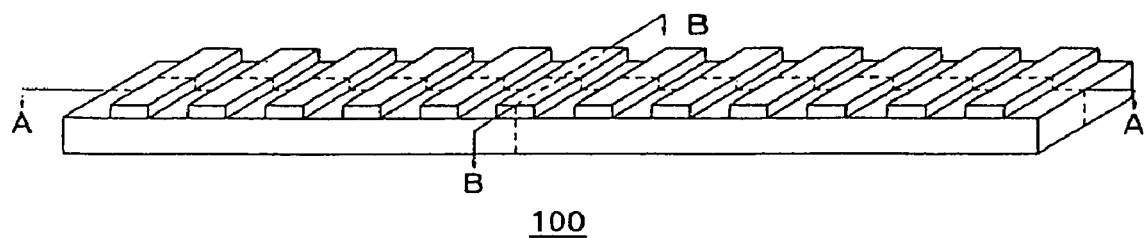
FIGS. 3A-3C show a second embodiment in which a DLC film is formed over the entire surface of the base.
Figure 3B:
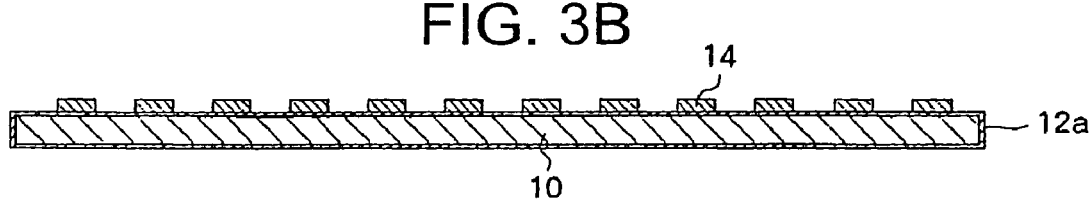
Figure 3C:
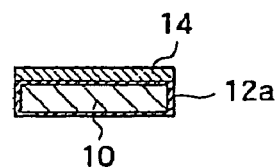

Meanwhile, the DLC layer 12a is a chemically and mechanically durable material and thus, when used as the light-absorbing layer 12, protects the base 10 from corrosion, rust, flaws, and so forth. FIGS. 3A-3C depict a scale 100 in which the light-absorbing layer 12 is formed over the entire surface of the base 10. FIG. 3A is a perspective overall view of the scale 100, FIG. 3B is a cross-sectional view along the cross-section A-A, and FIG. 3C is a cross-sectional view along the cross-section B-B. In FIGS. 3A-3C, the light-absorption layer 12 consists only of the DLC layer 12a for simplicity of description. Also, FIGS. 3A-3C show the individual members under magnification to make the drawings easy to understand.

The area of the base 10 of scale 100, to be irradiated with light emitted from a light source to be used is covered with the light-absorbing layer 12. However, as shown in FIG. 3B, a DLC layer 12a formed over the entire surface of the base 10 can protect the entire surface of the base 10 from corrosion, rust, flaws, and so forth.

The light-reflecting layer is a layer that reflects light emitted from the light source of a photoelectric encoder and is composed of a material with a higher reflectance than that of the light-absorbing layer 12 with respect to light falling within the wavelength range of light emitted from the light source of the photoelectric encoder.

The light-reflecting layer 14 is preferably a high-reflectance metal, such as aluminum (Al), chromium (Cr), nickel (Ni), gold (Au), silver (Ag), titanium (Ti), and tungsten (W), and preferably has a film thickness that yields a reflectance higher than that of the light-absorption layer 12. More specifically, a preferred thickness is one that yields a reflectance equal to or higher than 50% with respect to light falling within the wavelength range of light emitted from the light source of a photoelectric encoder to be used. For example, when any of the materials listed above is used, the film thickness of the light-reflecting layer 14 being equal to or greater than 100 nm yields a reflectance higher than that of the light-absorbing layer 12.

The light-reflecting layer 14 is formed at least on the area to be irradiated with light of the scale 100, and a plurality of the light-reflecting layers 14 are arranged in parallel along the longitudinal direction of the base 10 with a predetermined width W and a predetermined pitch P so as to form a grating. In FIG. 1, the light-reflecting layers 14 extend in the depth direction of the drawing. The width W and pitch P of the light-reflecting layers 14 are preferably set on the basis of the configuration of the reflection light detector of a photoelectric encoder to be used. For example, the width W and pitch P of the light-reflecting layers 14 are preferably set approximately in the range of 4 to 20 μm and approximately in the range of 8 to 40 μm, respectively.

Figure 4:
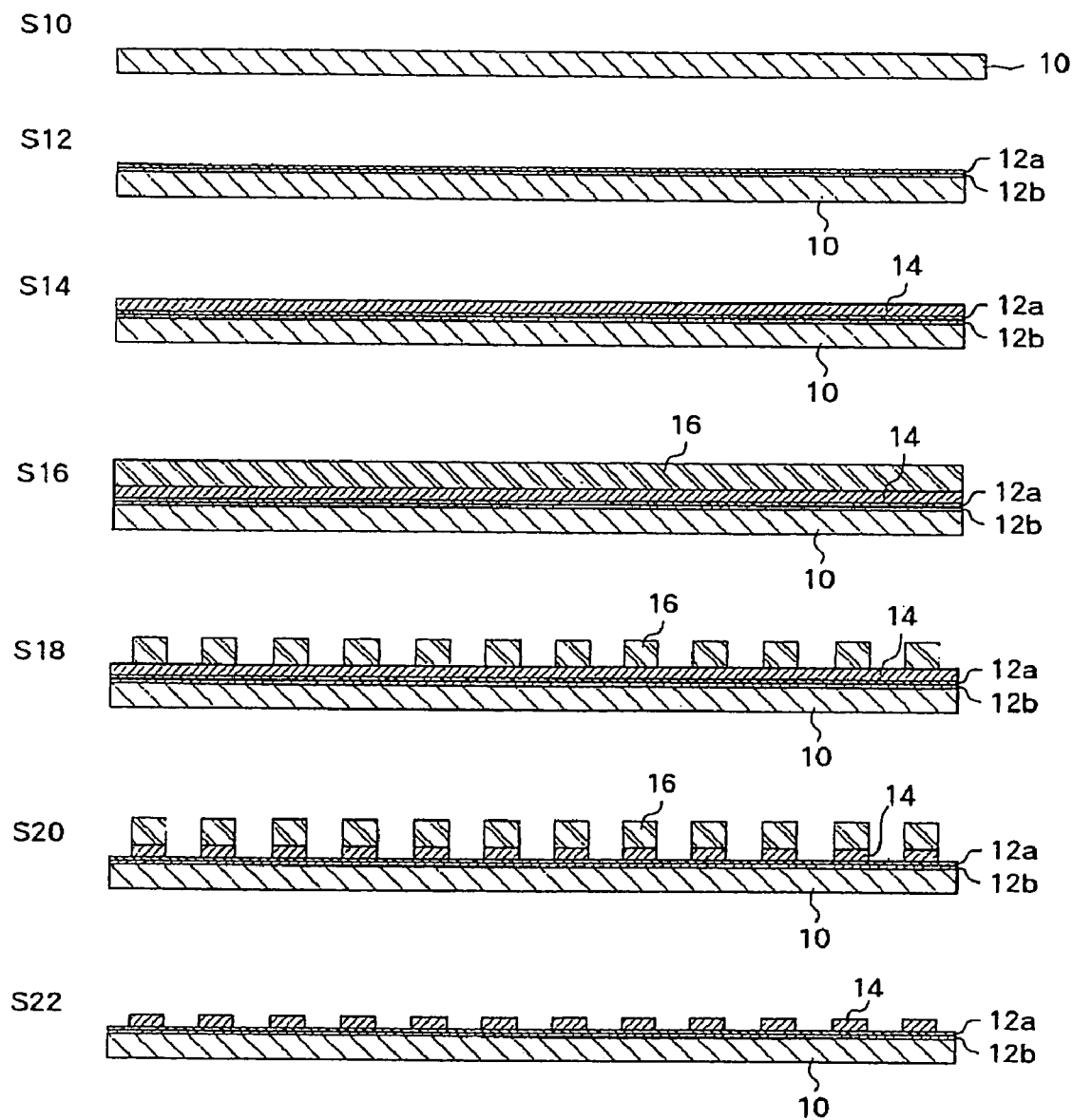
FIG. 4 shows a method for manufacturing a scale for a photoelectric encoder according to of the present invention.

The scale 100 according to this embodiment can be manufactured in accordance with the flow chart shown in FIG. 4.

Step S10 is a lapping treatment (polishing treatment) applied to the base 10. An example of applicable methods is surface polishing using a polishing material obtained by distributing abrasive grains over a resin matrix. The lapping treatment is continued until the surface roughness of the base 10 is sufficiently smaller than the thickness of the light-reflecting layer 14. For example, it is preferable to continue polishing until the surface roughness is equal to or smaller than 1/10 of the film thickness of the light-reflecting layer 14.

Step S12 is formation of the light-absorbing layer 12. When the light-absorbing layer 12 has a binder layer 12b, this step includes formation of the binder layer 12b as well as formation of the DLC layer 12a.

The binder layer 12b can be formed by sputtering, ion plating or some other physical film-forming method. When sputtering or ion plating is chosen, a known apparatus for the technique can be used. More specific procedures are as follows: a raw material target to be used as the material of the binder layer 12b, such as tungsten (W), tungsten carbide (WC), chromium (Cr), and titanium (Ti), is placed in a vacuum chamber, plasma of an inert gas (e.g., argon gas) is formed in the vacuum chamber so that the generated ions may sputter on the raw material target, and thus the material supplied by the raw material target forms the binder layer 12b on the surface of the base 10. When sputtering is chosen, preferred conditions for film formation include, for example, a film-forming pressure in the range of 0.1 to 1 Pa, a sputtering power in the range of 3000 to 6000 W, and a bias voltage of the base 10 in the range of 100 to 1000 V. However, the conditions for film-forming may be changed depending on other conditions, namely, the size of the vacuum chamber, the kind and size of the target, the distance between the target and the substrate, and so forth.

Meanwhile, when the binder layer 12b takes the two-layer structure of tungsten (W)/tungsten carbide (WC), a tungsten (W) target and a carbon (C) target are both put in a vacuum chamber in such a manner that the two targets may be sputtered independently of each other. The initial stage of film formation includes sputtering of the tungsten (W) target to form a tungsten (W) layer on the surface of the base 10. Then, the conditions are changed to those for simultaneous sputtering of the tungsten (W) target and the carbon (C) target, and thus a tungsten carbide (WC) layer is formed on the tungsten (W) layer. Here, a gradual increase in power for sputtering of the carbon (C) target would result in the content ratio of tungsten (W) in tungsten carbide (WC) increasing approaching the base 10 and the content ratio of carbon (C) in tungsten carbide (WC) increasing approaching the DLC layer 12a.

In addition, when the DLC layer 12a is formed directly on the base 10, the step of forming this binder layer 12b can be omitted.

The DLC layer 12a can be formed by sputtering, ion plating or some other physical film-forming method or by a chemical film-forming method such as chemical vapor deposition.

When the DLC layer 12a is formed using a physical film-forming method, a known apparatus for the technique can be used as in the formation of the binder layer 12b. More specific procedures are as follows: a raw material target to be used as the material of the DLC layer 12a, namely carbon (C), is placed in a vacuum chamber, plasma of an inert gas (e.g., argon gas) is formed in the vacuum chamber so that the generated ions may sputter the raw material target, and thus the DLC layer 12a is formed on the surface of the base 10 (or the surface of the binder layer 12b). For example, when sputtering is chosen, preferred conditions for film formation include a film-forming pressure in the range of 0.1 to 1 Pa, a sputtering power in the range of 3000 to 6000 W, and a bias voltage of the base 10 in the range of 100 to 1000 V. However, the conditions for film formation may be changed depending on other conditions, namely, the size of the vacuum chamber, the kind and size of the target, the distance between the target and the substrate, and so forth.

Also, when the DLC layer 12a is formed using a chemical film-forming method, the raw material gas may be methane ($CH_4$). The base 10 is placed in a vacuum chamber, the raw material gas is introduced thereinto, and then an electric power in the range of 50 to 500 W is supplied from a plasma antenna so that the raw material gas taking the form of plasma is provided to the surface of the base 10. During this step, the temperature of the base 10 is held constant in the range of room temperature to 400° C., which allows the DLC layer 12a to be formed on the surface of the base 10 (or the surface of the binder layer 12b). It is also preferable to apply a bias voltage in the range of 100 to 1000 V to the base 10. However, the conditions for film formation may be changed depending on other conditions, namely, the size of the vacuum chamber, the kind and size of the target, the distance between the target and the substrate, and so forth.

When the entire surface of the base 10 is covered with the binder layer 12b or the DLC layer 12a, this may be achieved by repeating the film-forming process several times while changing the orientation of the base 10 in the vacuum chamber as necessary. Chemical deposition is relatively suitable for this purpose because, in this technique, the raw material spreads around the edges of the base 10, thereby forming the DLC layer 12a over the entire surface of the base 10.

Also, this DLC layer 12a offers greater ease in controlling the film thickness thereof during formation than materials of light-absorbing layers used in known scales and thus has the additional advantage of simplifying the manufacturing process.

Step S14 is formation of the light-reflecting layer 14. The light-reflecting layer 14 can be formed by sputtering or vacuum evaporation. When any of these techniques is chosen, a known apparatus for the technique can be used. In this embodiment, the light-reflecting layer 14 is composed of a material containing at least any one of aluminum (Al), chromium (Cr), nickel (Ni), gold (Au), silver (Ag), titanium (Ti), and tungsten (W) and is formed at least on the area to be irradiated with light of the scale 100.

Step S16 is formation of a resist layer 16. This resist layer 16 is used as a mask layer in etching a grating on the light-reflecting layer 14. Spin coating, screen printing, or some other method can be used to form the resist layer 16 on the light-reflecting layer 14. Prebaking or other treatment needed for the resist layer 16 may also be performed.

Step S18 is exposure and development of the resist layer 16. A photolithographic mask is placed on the resist layer 16, and then the masked resist layer 16 is exposed to light. When the resist layer 16 is a positive resist, the photolithographic mask is formed so that the areas to be left as the light-reflecting layers 14 may be masked from light; on the other hand, when the resist layer 16 is a negative resist, the photolithographic mask is formed so that the areas to be left as the light-reflecting layers 14 may be exposed to light. For example, the width W and pitch P of the light-reflecting layers 14 are, as shown in FIG. 1, preferably set approximately in the range of 4 to 20 µm and approximately in the range of 8 to 40 µm, respectively.

Then, the resist layer 16 is developed. When the resist layer 16 is a positive resist, the portions exposed to light of the resist layer 16 are removed using a strongly basic aqueous solution; on the other hand, when the resist layer 16 is a negative resist, the portions of the resist layer 16 other than those exposed to light are removed using a solvent that dissolves the material of the resist. Following development, postbaking or other treatment needed for the resist layer 16 may be performed.

Step S20 is etching of the light-reflecting layers 14. Etching of the light-reflecting layer 14 may be achieved by wet etching using an etchant or by dry etching such as reactive ion etching (RIE). For example, a known method suitable for the material of the light-reflecting layer 14 can be used for etching of the light-reflecting layer 14.

Step S22 is removal of the resist layers 16. Removal of the resist layer 16 may be achieved by a wet method using a resist remover or by ashing based on reactive ion etching (RIE) or the like. A known method suitable for the kind of resist used, the film thickness of the resist layer 16, and so forth can be used to remove the resist layer 16.

The flow described above provides the scale 100 according to the embodiment of the present invention.

The above described embodiments are examples and various modifications can be made without departing from the spirit and scope of the invention.

What is claimed is:

1. A scale for a photoelectric encoder that detects reflection of light within a predetermined wavelength range, the scale comprising:
   a base;
   a light-absorbing layer including a DLC layer formed over all surfaces of the base; and
   a light-reflecting layer with a higher reflectance than a reflectance of the light-absorbing layer with respect to light falling within the predetermined wavelength range and formed into a grating on the light-absorbing layer.

2. The scale according to claim 1, wherein:
   a thickness of the DLC layer is in the range of 250 nm to 1 µm.

3. The scale according to claim 2, wherein:
   the light-absorbing layer has a binder layer containing at least a metal between the base and the DLC layer.

4. The scale according to claim 2, wherein:
   the DLC layer is formed over all surfaces of the base.

5. The scale according to claim 2, wherein:
   the light-absorbing layer has a reflectance no greater than 20% with respect to light falling within the predetermined wavelength range.

6. The scale according to claim 1, wherein:
   the light-absorbing layer has a binder layer containing at least a metal between the base and the DLC layer.

7. The scale according to claim 6, wherein:
   the binder layer contains at least one of a tungsten layer, a tungsten carbide layer, a chromium layer, and a titanium layer.

8. The scale according to claim 7, wherein:
   the light-absorbing layer has a reflectance no greater than 20% with respect to light falling within the predetermined wavelength range.

9. The scale according to claim 6, wherein:
   the binder layer contains a tungsten carbide layer, relative proportions of carbon and tungsten contained therein varying along a thickness direction of the binder layer.

10. The scale according to claim 9, wherein:
    the light-absorbing layer has a reflectance no greater than 20% with respect to light falling within the predetermined wavelength range.

11. The scale according to claim 6, wherein:
    the light-absorbing layer has a reflectance no greater than 20% with respect to light falling within the predetermined wavelength range.

12. The scale according to claim 1, wherein:
    the light-absorbing layer has a reflectance no greater than 20% with respect to light falling within the predetermined wavelength range.

13. The scale according to claim 1, wherein:
    the light-absorbing layer has a binder layer containing at least a metal between the base and the DLC layer.

14. The scale according to claim 1, wherein:
    the light-absorbing layer has a reflectance no greater than 20% with respect to light falling within the predetermined wavelength range.

15. The scale according to claim 1, wherein the base is made of one of stainless steel and crystalline glass having an expansion coefficient of substantially zero.

16. The scale according to claim 1, wherein the base is made of one of metal, glass and plastic.

17. The scale according to claim 1, wherein the base is a metal having a thickness in the range of 0.1 mm to 5 mm.

18. The scale according to claim 17, wherein the scale is flexible so as to be capable of being reeled.

* * * * *